(12) United States Patent
Eom et al.

(10) Patent No.: US 11,237,982 B2
(45) Date of Patent: Feb. 1, 2022

(54) METHODS AND APPARATUSES FOR MANAGING PAGE CACHE IN VIRTUALIZATION SERVICE

(71) Applicant: RESEARCH & BUSINESS FOUNDATION SUNGKYUNKWAN UNIVERSITY, Suwon-si (KR)

(72) Inventors: Young Ik Eom, Seoul (KR); Kwon Je Oh, Suwon-si (KR); Jong Gyu Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 144 days.

(21) Appl. No.: 16/774,575

(22) Filed: Jan. 28, 2020

(65) Prior Publication Data
US 2020/0264986 A1  Aug. 20, 2020

(30) Foreign Application Priority Data

Feb. 15, 2019  (KR) .................. 10-2019-0018116

(51) Int. Cl.
*G06F 12/00* (2006.01)
*G06F 12/122* (2016.01)

(52) U.S. Cl.
CPC ...... *G06F 12/122* (2013.01); *G06F 2212/601* (2013.01); *G06F 2212/652* (2013.01)

(58) Field of Classification Search
CPC ............ G06F 12/122; G06F 2212/601; G06F 2212/652; G06F 12/0882; G06F 12/126;
(Continued)

(56) References Cited

U.S. PATENT DOCUMENTS 7,747,838 B2 *  6/2010  Hepkin ............... G06F 12/1027
                                                    711/209
8,438,363 B1 *  5/2013  Koryakin ............ G06F 9/30076
                                                    711/207
(Continued)

FOREIGN PATENT DOCUMENTS

KR   10-2009-0016139 A   2/2009
KR   10-2014-0040798 A   4/2014
(Continued)

OTHER PUBLICATIONS

Oh, Kwonje et al., "Weight-Based Page Cache Management Scheme for Enhancing I/O Proportionality of Cgroups", *2019 IEEE International Conference on Consumer Electronics (ICCE)*, 2019 (pp. 1-4).
(Continued)

*Primary Examiner* — Mardochee Chery
(74) *Attorney, Agent, or Firm* — NSIP Law (57) ABSTRACT

Provided are a method and an apparatus for managing a page cache in a virtualization service and a method for managing a page cache in a virtualization service according to an exemplary embodiment of the present disclosure includes: comparing a weight value of a container and a weight variable of a page possessed by a process operated by the container in the virtualization service with each other, changing the weight variable of the page based on a comparison result, and managing pages of the page cache using the changed weight variable of the page.

20 Claims, 8 Drawing Sheets

(58) Field of Classification Search
CPC .......... G06F 2212/461; G06F 12/0871; G06F 12/0875; G06F 9/5077; G06F 9/45558; G06F 2009/45579
USPC ........................................................ 711/133
See application file for complete search history.

(56) References Cited

U.S. PATENT DOCUMENTS

| | | | |
|---|---|---|---|
| 9,875,191 B2 * | 1/2018 | Chang | ................. G06F 12/1063 |
| 10,223,276 B2 * | 3/2019 | Tsirkin | .................. G06F 3/0647 |
| 2012/0140633 A1 | 6/2012 | Stanwood et al. | |
| 2015/0293720 A1 | 10/2015 | Lam et al. | |

FOREIGN PATENT DOCUMENTS

| | | |
|---|---|---|
| KR | 10-2015-0091158 A | 8/2015 |
| KR | 10-2015-0097981 A | 8/2015 |

OTHER PUBLICATIONS

Korean Office Action dated Jul. 27, 2020 for the corresponding Korean Patent Application No. 10-2019-0018116 (5 pages in Korean).

* cited by examiner

METHODS AND APPARATUSES FOR MANAGING PAGE CACHE IN VIRTUALIZATION SERVICE

CROSS-REFERENCE TO RELATED APPLICATIONS

This application claims priority to Korean Patent Application No. 10-2019-0018116 filed on 15 Feb. 2019 in Korea, the entire contents of which are hereby incorporated by reference in their entirety.

BACKGROUND

1. Technical Field

The present disclosure relates to methods and apparatuses for managing a page cache in a virtualization service.

2. Description of Related Art

Docker uses control groups (Cgroups) in order to control a resource of a container sharing and running an operating system (OS) of the same host. An input/output (I/O) weight may be designated through a block I/O weight for each container through control groups and the weight is used when a block I/O scheduler such as a completely fair queuing (CFO) scheduler performs I/O processing.

However, since the scheduler is positioned on a layer lower than a page cache and operates, the page cache manages a page while not considering the corresponding weight. The page cache uses multiple processors together as a shared memory resource. Therefore, since it is difficult to determine which processor possesses the pages of the page cache, the pages are managed based on their own criteria. The page cache manages the pages with two LRU lists, i.e., an active least recently used (LRU) list and an inactive LRU list. However, when the page cache inserts or removes the pages into the lists, the block I/O weight set by the control groups is not a consideration target. As a result, even though the I/O weights of the processors are different from each other, the pages of the processors do not remain at a proportionality of the corresponding weight. Consequently, in an I/O request-oriented workload environment through the page cache, containers having different weights show a result in which proportionalities of an I/O throughput is similar.

SUMMARY

Exemplary embodiments of the present disclosure have been made in an effort to provide methods and apparatuses for managing a page cache in a virtualization service in order to guarantee QoS in the virtualization service such as Docker.

Exemplary embodiments of the present disclosure have been made in an effort to provide methods and apparatuses for managing a page cache in a virtualization service, which mange a page by allocating the page in the page cache or evicting the page by considering I/O weights of control groups set for each container even in the page cache to provide a similar result in performances of containers having different weights to an I/O weight proportionality.

One example embodiment of the present disclosure, provided is a method for managing a page cache in a virtualization service, which includes: comparing a weight value of a container and a weight variable of a page possessed by a processor operated by the container in the virtualization service with each other; changing the weight variable of the page based on a comparison result; and managing pages of the page cache using the changed weight variable of the page.

In the comparing of the weight variable of the page, when there is a page of which reading is requested in the page cache, the weight value of the container and the weight variable of the page may be compared with each other.

In the changing of the weight variable of the page, when the weight value of the container exceeds the weight variable of the page, the weight variable of the page may be set to the weight value of the container.

In the changing of the weight variable of the page, when the weight value of the container is equal to or less than the weight variable of the page, the weight variable of the page may be maintained.

In the managing of the pages of the page cache, when there is a free space in the page cache, the weight variable of the page may be set equal to the weight value of the container and a chance value of the page may be set using the set weight variable of the page.

In the managing of the pages of the page cache, when there is no free space in the page cache, sizes of an active list and an inactive list may be compared with each other.

In the managing of the pages of the page cache, when the active list of the page cache exceeds the inactive list of the page cache, a predetermined page quantity may be separated from a tail of the active list to prepare page eviction.

In the managing of the pages of the page cache, when a chance value of a page to be evicted in the page cache exceeds a predetermined threshold and the chance value of the page to be evicted exceeds a predetermined remaining chance value, the page to be evicted may be moved to a head of the active list and then the predetermined chance value may be subtracted.

In the managing of the pages of the page cache, when the chance value of the page to be evicted in the page cache exceeds the predetermined threshold and the chance value of the page to be evicted is equal to or less than the predetermined remaining chance value, the page to be evicted may be moved to the tail of the active list and then the predetermined chance value may be subtracted.

In the managing of the pages of the page cache, when the chance value of the page to be evicted in the page cache does not remain, the page to be evicted may be moved to the inactive list.

Meanwhile, other example embodiment of the present disclosure, provided is an apparatus for managing a page cache, which includes: a page cache storing pages possessed by a process operated by a container; a memory storing at least one command; and a processor connected to the storage module and the memory, in which the processor executes the at least one command to compare a weight value of the container and a weight variable of a page in a virtualization service, change the weight variable of the page based on a comparison result, and manage the pages of the page cache using the changed weight variable of the page.

When there is a page of which reading is requested in the page cache, the processor may compare the weight value of the container and the weight variable of the page with each other.

When the weight value of the container exceeds the weight variable of the page, the processor may set the weight variable of the page to the weight value of the container.

When the weight value of the container is equal to or less than the weight variable of the page, the processor may maintain the weight variable of the page.

When there is a free space in the page cache, the processor may set the weight variable of the page equal to the weight value of the container and set a chance value of the page using the set weight variable of the page.

When there is no free space in the page cache, the processor may compare sizes of an active list and an inactive list with each other.

When the active list of the page cache exceeds the inactive list of the page cache, the processor may separate a predetermined page quantity from a tail of the active list to prepare page eviction.

When a chance value of a page to be evicted in the page cache exceeds a predetermined threshold and the chance value of the page to be evicted exceeds a predetermined remaining chance value, the processor may move the page to be evicted to a head of the active list and then subtract the predetermined chance value.

When the chance value of the page to be evicted in the page cache exceeds the predetermined threshold and the chance value of the page to be evicted is equal to or less than the predetermined remaining chance value, the processor may move the page to be evicted to the tail of the active list and then subtract the predetermined chance value.

When the chance value of the page to be evicted in the page cache does not remain, the processor may move the page to be evicted to the inactive list.

Meanwhile, in yet another aspect, provided is a computer readable storage medium including commands executed by a processor in which when the commands are executed by a processor, the processor is configured to compare a weight value of a container and a weight variable of a page in a virtualization service, change the weight variable of the page possessed by the processor operated by a container based on a comparison result, and manage the page of a page cache using the changed weight variable of the page.

DETAILED DESCRIPTION OF EXAMPLE EMBODIMENTS

The present disclosure may be variously changed and have various exemplary embodiments and specific exemplary embodiments will be illustrated in the drawings and described in detail.

However, this does not limit the present disclosure to specific exemplary embodiments, and it should be understood that the present disclosure covers all the modifications, equivalents and replacements included within the idea and technical scope of the present disclosure.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that a component is "directly connected to" or "directly accesses" another component, it is understood that no element is present between the element and another element.

Terms used in the present application are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present disclosure will be described in more detail with reference to the accompanying drawings. In describing the present disclosure, the same reference numerals are used for the same components in the drawings and a duplicated description of the same components will be omitted for facilitating overall understanding.

Figure 1:
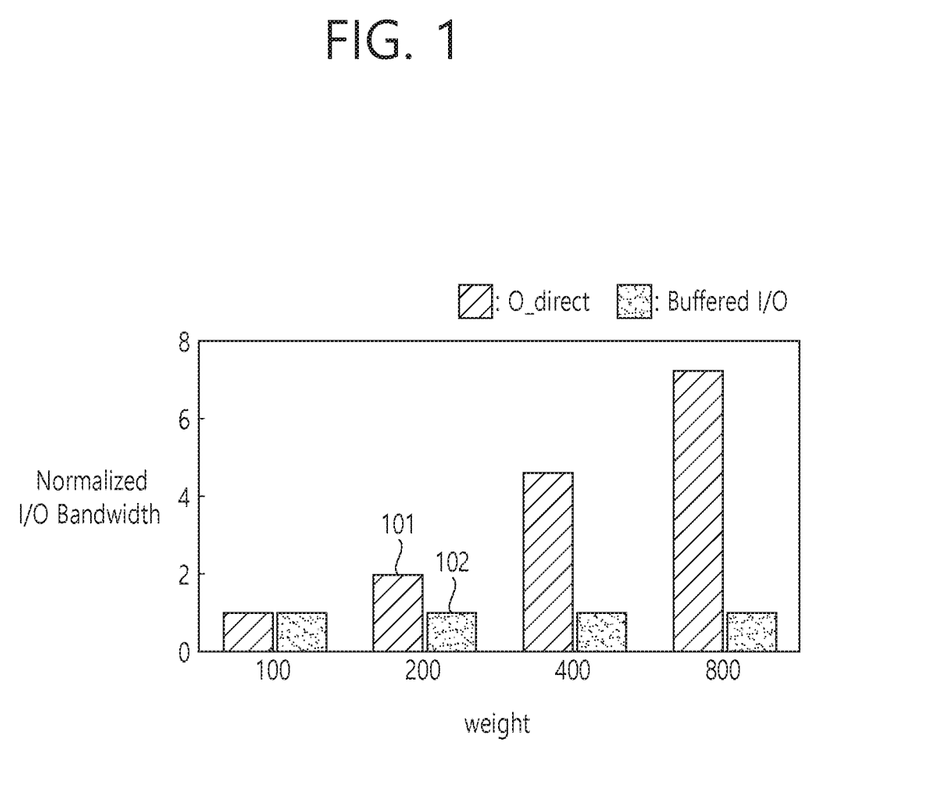
FIG. 1 is a comparison graph showing a proportionality of throughputs of direct and buffered I/O.

FIG. 1 is a comparison graph showing a proportionality of throughputs of direct I/O and buffered I/O.

As described above, a conventional Linux page cache does not reflect block I/O weights of control groups, but manages pages based on only a page cache layer. Further, the page cache as a resource shared by all processors may not know which processor possesses which pages stored in the page cache. As a result, the control groups are used in order to limit and isolate usage of the resource shared when generating a container using Docker. Therefore, even though a user differently sets the weight for each individual container in order to differently set the weight of an I/O throughput for each container, the user does not provide performance at a set weight proportionality. When four containers having different weights are generated to perform I/O processing by setting an O direct option performing direct I/O without passing through a page cache layer, a proportionality of I/O is close to a set weight proportionality of the container.

However, when the I/O processing is performed by buffered I/O which is a scheme in which conventional Linux performs the I/O processing, it is possible to identify the I/O proportionality using the page cache layer. For example, as illustrated in FIG. 1, if the weights are set to 100, 200, 400, and 800 when there are containers 1, 2, 3, and 4, a throughput proportionality 101 of Direct I/O is close to 1:2:4:8, but a throughput proportionality 102 of buffered I/O becomes 1:1:1:1. This is represented as normalized I/O bandwidth according to the weight.

Figure 2:
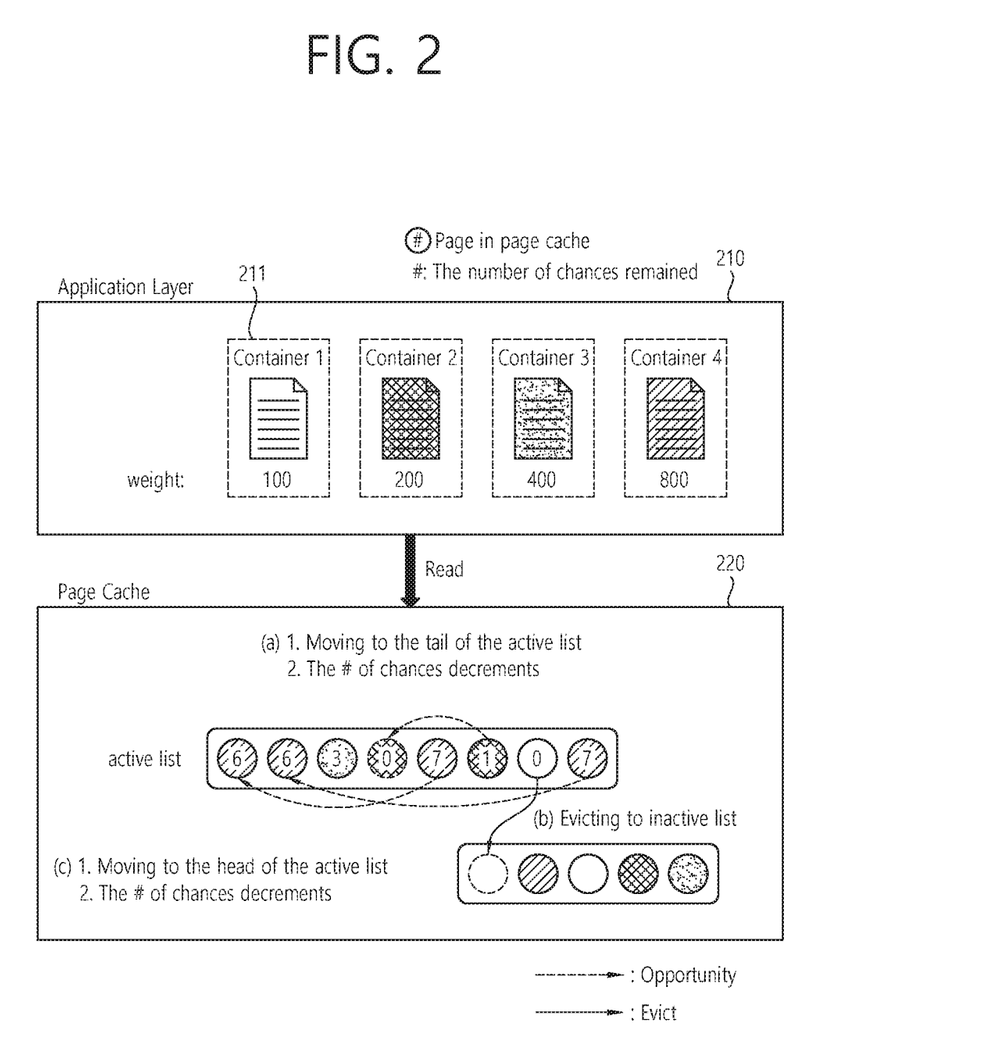
FIG. 2 is an exemplary diagram for page cache eviction management to which weights of control groups differently set for each container are applied according to an exemplary embodiment of the present disclosure.

FIG. 2 is an exemplary diagram for page cache eviction management to which weights of control groups differently set for each container are applied according to an exemplary embodiment of the present disclosure.

In an exemplary embodiment of the present disclosure, when the user differently sets and generates the I/O weights of the control groups for each individual container in an application layer, the page cache may adjust the proportionality of the I/O throughput by managing the pages by reflecting the I/O weight.

In an exemplary embodiment of the present disclosure, whenever the processor accesses the page in the page ache, the user utilizes a weight value when an eviction task occurs from an active LRU list to an inactive LRU list by storing the control group I/O weight value set therefor in a page structure.

When the control groups generate a resource group and designate the block I/O weight, an internal data structure of the control groups called a block I/O subsystem includes the corresponding weight value. In an exemplary embodiment of the present disclosure, a weight variable called ioweight is generated in the page structure to allow the page to maintain the I/O weights of the control groups. Accordingly, when the processor allocates a new page to the page cache, the I/O weight value possessed by a resource group of the processor is stored in the ioweight variable of the page.

However, the page stored in the page cache may be accessed by another processor having a larger weight value than the processor possessed thereby. In order to solve the problem, whenever the processor accesses the page in the page cache, the ioweight value of the page and the I/O weight value of the processor resource group are compared with each other. If the ioweight value is smaller, the ioweight value is replaced with the I/O weight value and in an opposite case, the ioweight value is maintained.

In summary, the ioweight variable of the page has a largest value among the I/O weight values of the processors accessing the ioweight variable. In this scheme, the ioweight variable is utilized and used as the number of remaining chances without evicting the page during the eviction task. The chance becomes a value acquired by dividing the I/O weight by 100 and then subtracting 1 from the value. For example, the I/O weight value of 800 is stored as 7 in the ioweight variable.

In an exemplary embodiment of the present disclosure, pages having large weights may be fundamentally made to stay in the page cache during the page cache eviction task at most to increase a throughput of the process using the corresponding page. The ioweight variable of the page means a survival chance without sending the page during the eviction task. When the ioweight variable is 0 or more, one remaining chance is additionally acquired in the active list even though the page is designated as a candidate to be evicted, and as a result, an ioweight value is reduced by one and the page moves to a head or a tail of the list. When the page moves to the head, the page moves when the ioweight value is relatively larger than that of another page. When ioweight is 0, the page is demoted to the inactive list. As such, pages having larger weights may be remained in the page cache relatively longer.

In an exemplary embodiment of the present disclosure, when the page is allocated, the I/O weight values of the control groups of the processor using the corresponding page are stored in the page structure as the variable ioweight. Accordingly, in an exemplary embodiment of the present disclosure, when the page is evicted in the active LRU list of the page cache, the page cache may be managed so as to evict the page by considering the ioweight value of the page.

One example illustrated in FIG. 2 will be described. The application layer 210 of FIG. 2 includes respective containers 211. Each container 211 has a weight value (e.g., 100, 200, 400, 800, etc.) of the container for each container. A page cache 220 includes an active list 221 and an inactive list 222. The page in the page cache 220 has a chance value representing the number of chances remained. As illustrated in FIG. 2A, the page of the active list 221 decrements a chance value by a predetermined value (e.g., 1) while the page of the active list 221 moves the tail of the active list 221 (The # of chances decrements). As illustrated in FIG. 2B, when an eviction preparation task is performed in the page cache, pages of a predetermined page quantity 223 is prepared to be evicted to an inactive list 222 at a tail portion of the active list 221. Herein, a page having a chance value of 0 among the pages of a predetermined page quantity 223 is evicted to the inactive list 222 (Evicting to inactive list). As illustrated in FIG. 2C, a page in which more chance values remain than a predetermined value (e.g., 4, 5, etc.) among the pages of the predetermined page quantity 223 moves to the head of the active list 221 (Moving to the head of the active list). The chance value decrements by a predetermined value (e.g., 1) (The # of chances decrements).

Figure 3:
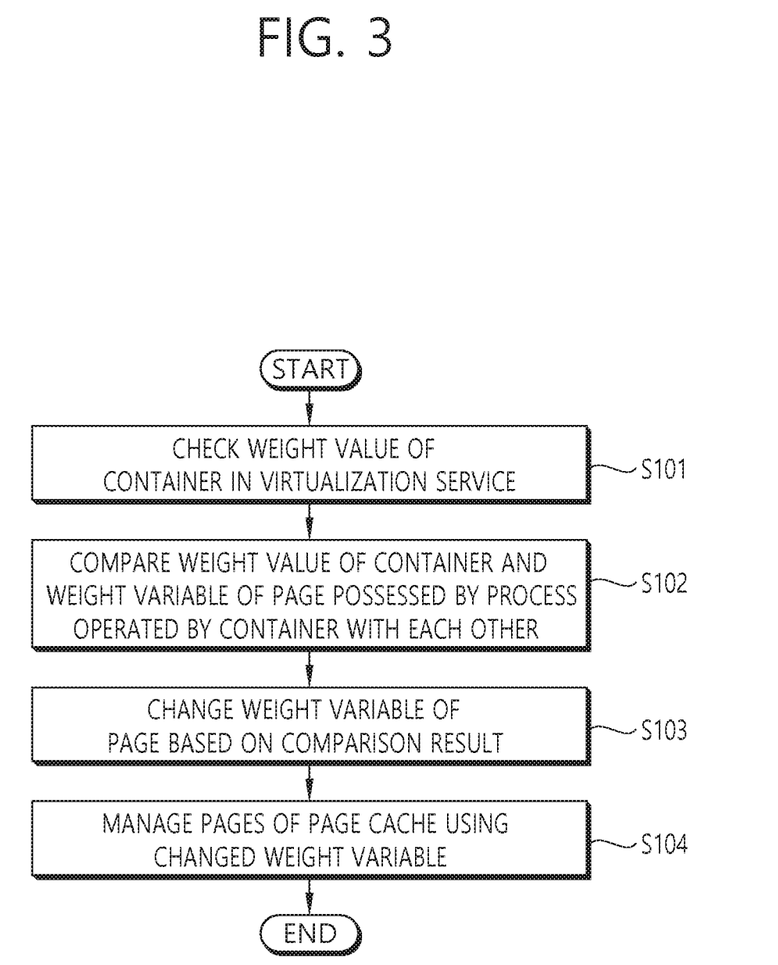
FIG. 3 is a flowchart for describing methods for managing a page cache in a virtualization service according to an exemplary embodiment of the present disclosure.

FIG. 3 is a flowchart for describing methods for managing a page cache in a virtualization service according to an exemplary embodiment of the present disclosure.

In step S101, the page cache management apparatus according to an exemplary embodiment of the present disclosure identifies the weight value of the container in the virtualization service.

In step S102, the page cache management apparatus compares the weight variable of the page possessed by the processor operated by the container with the weight value of the container.

In step S102, the page cache management apparatus changes the weight variable of the page based on a comparison result.

In step S102, the page cache management apparatus manages the page of the page cache using the changed weight variable of the page.

Figure 4:
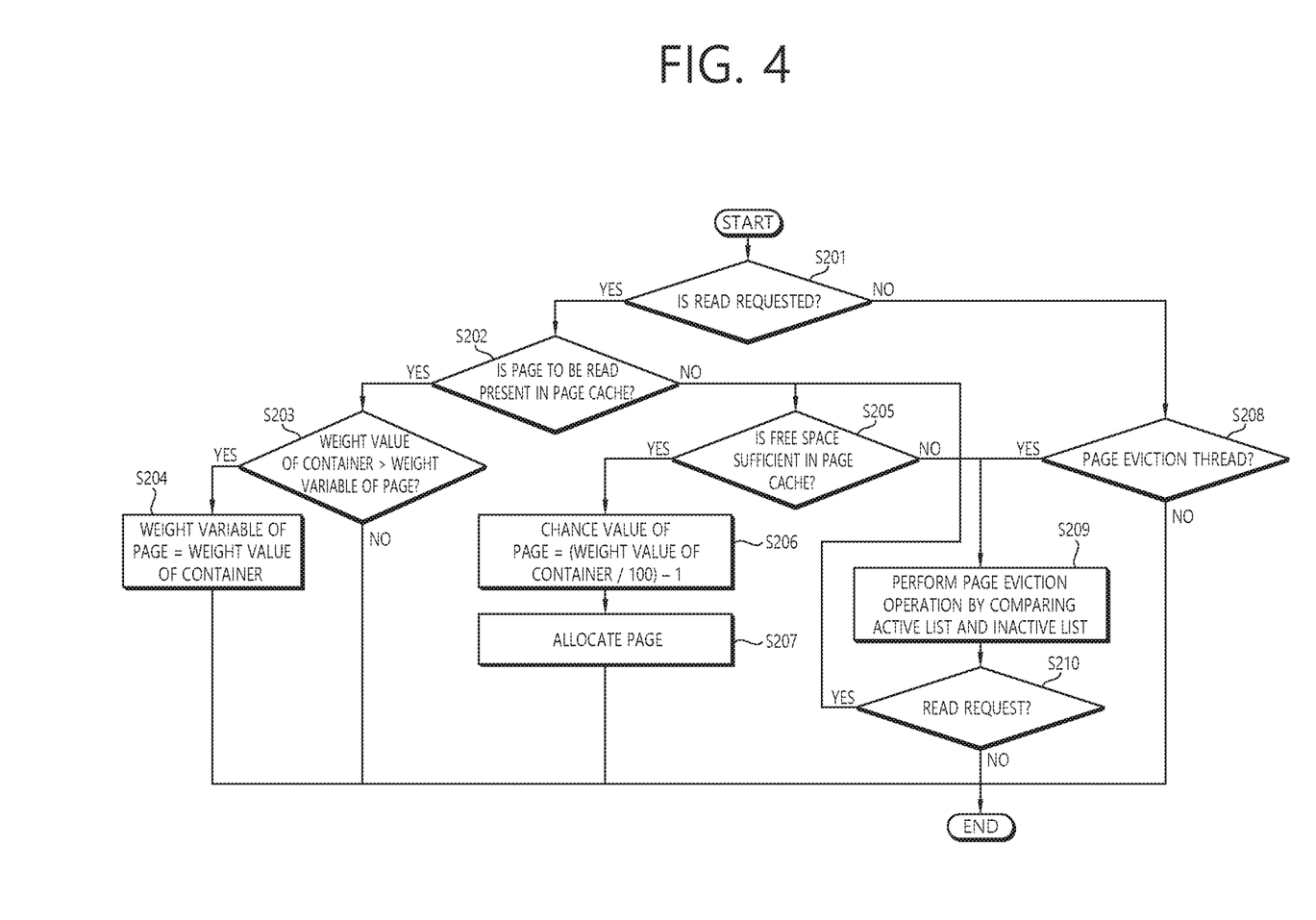
FIGS. 4 and 5 are flowcharts for specifically describing methods for managing a page cache in a virtualization service according to an exemplary embodiment of the present disclosure.
Figure 5:
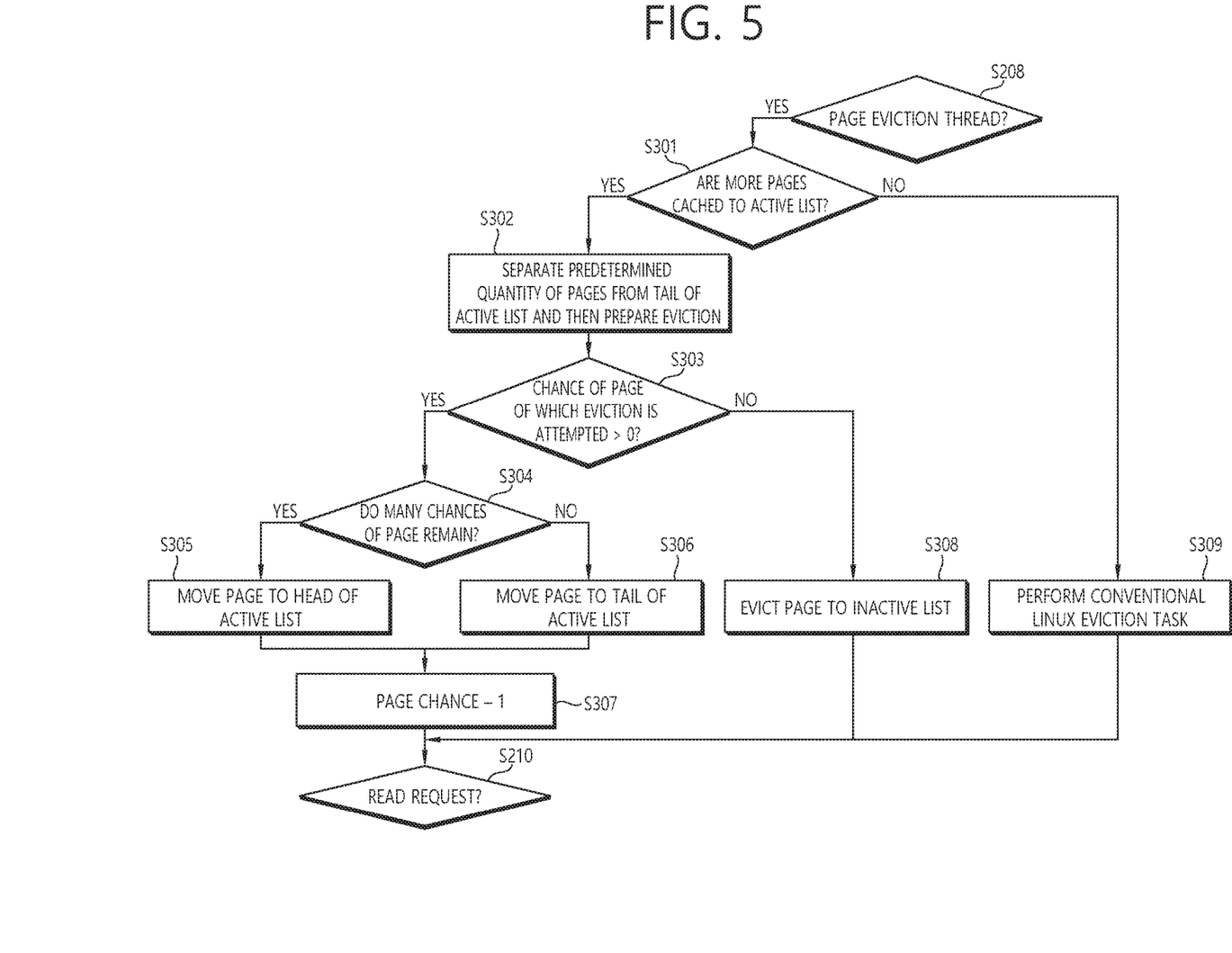

FIGS. 4 and 5 are flowcharts for specifically describing methods for managing a page cache in a virtualization service according to an exemplary embodiment of the present disclosure.

An exemplary embodiment of the present disclosure relates to methods for managing a page cache for reflecting an input/output performance proportionality weight value set in the container to an input/output request using the page cache. Page eviction is a task performed by a page eviction thread (Kernel swap daemon (kswapd) for providing a free space in the page cache or when a memory space is insufficient.

First, a situation for providing the free space in the page cache when allocating the page will be described.

As illustrated in FIG. 4, in step S201, the page cache managing apparatus according to an exemplary embodiment of the present disclosure checks whether there is a read request. The container attempts a read input/output request.

In step S202, the page cache managing apparatus checks whether a page to be read is present in the page cache when there is the read request. The page cache managing apparatus checks whether the requested page is present in the page cache.

In step S203, the page cache managing apparatus checks whether the weight value of the container exceeds a weight variable of the page when the page to be read is present in the page cache. When the page is present in the page cache, the page cache managing apparatus compares a weight value of a container which attempts the request and a weight value set in the page and when the weight value of the container is large, the page cache managing apparatus sets the weight value of the page to the container weight value.

In step S204, the page cache managing apparatus matches the weight variable of the page with the weight value of the container when the weight value of the container exceeds the weight variable of the container. The page cache managing apparatus does not change but maintain the weight variable of the p age when the weight value of the container does not exceed the weight variable of the page.

Meanwhile, in step S205, the page cache managing apparatus checks whether there is an enough free space in the page cache when the page to be read is not present in the page cache. When the page to be read is not present in the page cache, the page cache managing apparatus checks whether there is the enough free space in the current page cache.

In step S206, the page cache managing apparatus divides the weight value of the container by 100 and subtracts 1 from the corresponding value to set the acquired value to the chance value of the page when there is the enough free space in the page cache. The page cache managing apparatus may set the page weight to be equal to the container weight value and then grant a value acquired by subtracting 1 from in place of 100 from the container weight value to the page as the chance value.

In step S207, the page cache managing apparatus sets the chance value of the page and then allocates the page to the page cache. The page cache managing apparatus allocates the page.

In step S208, the page cache managing apparatus checks a page eviction thread when there is no read request. After step S208, the page cache managing apparatus ends a page management operation when there is no page eviction thread.

In step S209, the page cache managing apparatus compares the active list and the inactive list and perform a page eviction operation when there is the page eviction thread.

The page cache managing apparatus performs step S209 when the free space is not enough in the page cache in step S205. The page cache managing apparatus compares sizes of the active list and the inactive list of the page cache when the free space is not enough.

In step S210, the page cache managing apparatus checks whether there is the read request.

The page cache managing apparatus performs step S205 when there is the read request after step S210. The page cache managing apparatus ends the page cache management operation when there is no read request after step S210.

Meanwhile, the page eviction operation disclosed in step S209 will be described in detail with reference to FIG. 5.

In step S208, the page cache managing apparatus checks the page eviction thread when there is no read request. After step S208, the page cache managing apparatus may perform the page eviction operation according to steps S301 to S309.

In step S301, the page cache managing apparatus checks whether more pages are cached in the active list.

In step S302, when more pages are cached in the active list, the page cache managing apparatus separates a predetermined quantity of pages at the tail of the active list and then prepares page eviction. When the active list is larger, the page cache managing apparatus separates a predetermined quantity at the tail of the active list and then prepares the page eviction.

In step S303, the page cache managing apparatus checks whether a page chance value in which eviction is attempted exceeds 0. The page cache managing apparatus checks whether a change of a page to be evicted is larger than 0.

In step S304, when the page chance value exceeds 0, the page cache managing apparatus checks whether many chances of the page remain. When the chance of the page is larger than 0, the page cache managing apparatus checks whether many chances remain.

In step S305, when many chances of the page remain, the page cache managing apparatus moves the page to the head of the active list. When many chances remain, i.e., when the chance value exceeds a predetermined value, the page cache managing apparatus moves the page to the head of the active list and then decrements the chance by 1.

In step S306, when many chances of the page do not remain, the page cache managing apparatus moves the page to the tail of the active list. When a small number of chances remain, i.e., when the chance value is smaller than a predetermined value, the page cache managing apparatus moves the page to the tail of the active list and then decrements the chance by 1.

In step S307, the page cache managing apparatus performs step S305 or step S306 of moving the page to the active list and subtracts 1 from the chance value of the page.

In step S308, when the page chance value does not exceed 0, the page cache managing apparatus evicts the page to the inactive list. When the chance of the page is 0, the page cache managing apparatus moves the page to the inactive list.

Meanwhile, in step S309, when more pages are not cached in the active list, the page cache managing apparatus performs a conventional Linux eviction task. When the inactive list is larger, the page cache managing apparatus performs eviction by a conventional page eviction scheme of Linux.

The page cache managing apparatus performs step S307, step S308, or step S309 and then performs step S210 of checking whether there is the read request.

Meanwhile, a situation in which a memory space is insufficient and the page eviction thread performs page eviction may be performed as illustrated in FIG. 5. Hereinafter, the situation will be described in brief again.

The page cache managing apparatus compares the sizes of the active list and the inactive list of the page cache.

When the active list is larger, the page cache managing apparatus separates a predetermined quantity at the tail of the active list and then prepares the page eviction.

The page cache managing apparatus checks whether a change of a page to be evicted is larger than 0.

When the chance of the page is larger than 0, the page cache managing apparatus checks whether many chances remain.

When many chances remain, the page cache managing apparatus moves the page to the head of the active list and then decrements the chance by 1.

When a small number of chances remain, the page cache managing apparatus moves the page to the tail of the active list and then decrements the chance by 1.

When the chance of the page is 0, the page cache managing apparatus moves the page to the inactive list.

When the inactive list is larger, the page cache managing apparatus performs eviction by a conventional page eviction scheme of Linux.

Thereafter, the page cache managing apparatus ends the page eviction operation.

Figure 6:
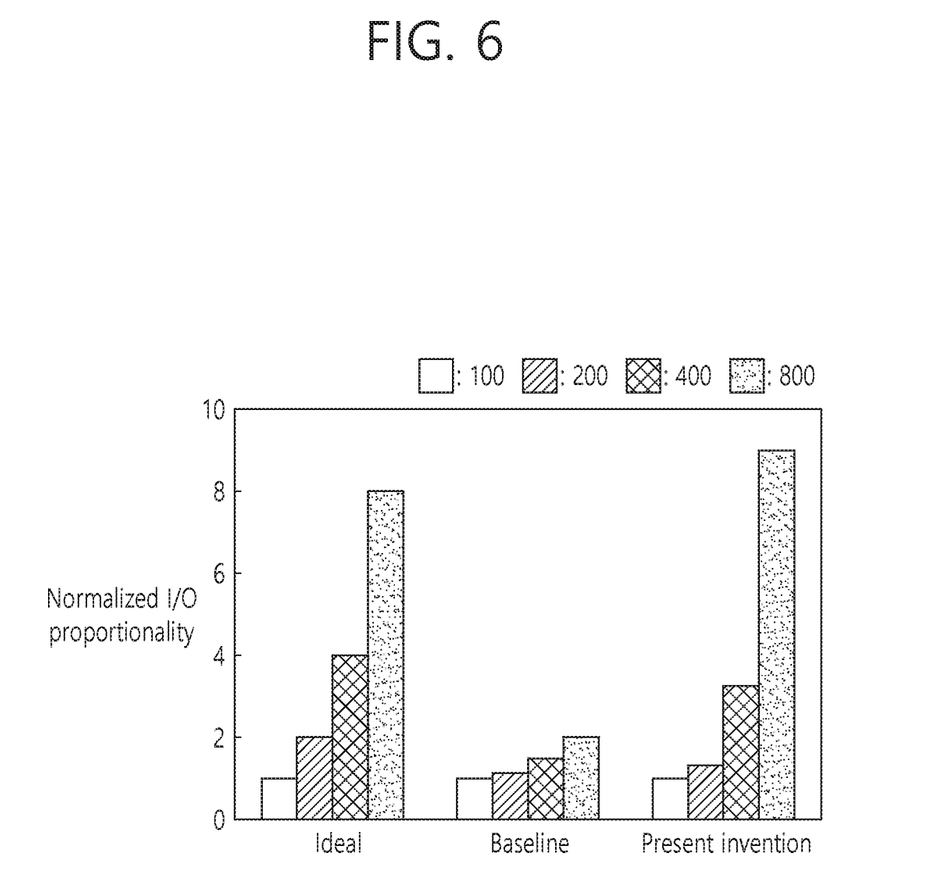
FIG. 6 is a throughput proportionality comparison graph for identifying a difference among an ideal I/O proportionality and I/O proportionalities in a conventional scheme and methods for managing a page cache according to an exemplary embodiment of the present disclosure.

FIG. 6 is a throughput proportionality comparison graph for identifying a difference among an ideal I/O proportionality and I/O proportionalities in a conventional scheme and methods for managing a page cache according to an exemplary embodiment of the present disclosure.

Figure 7:
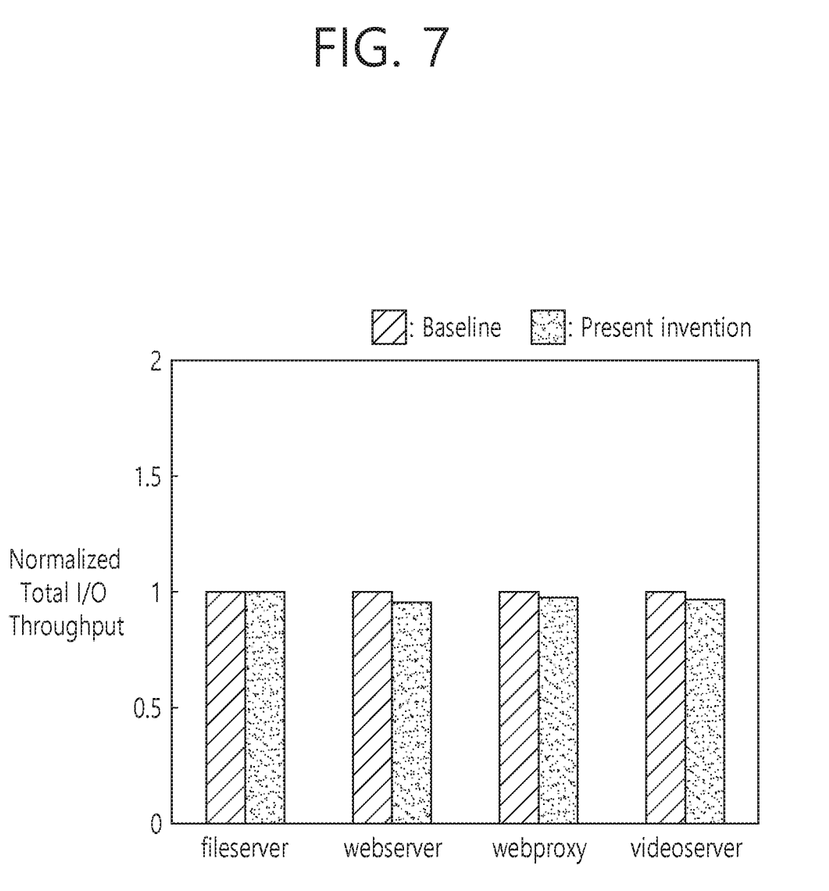
FIG. 7 is a comparison graph for identifying overhead which occurs in an exemplary embodiment of the present disclosure by comparison with a conventional scheme.

FIG. 7 is a comparison graph for identifying overhead which occurs in an exemplary embodiment of the present disclosure by comparison with a conventional scheme.

Experimental contents according to an exemplary embodiment of the present disclosure will be described.

In an exemplary embodiment of the present disclosure, in order to check whether processors in which weights of the control groups are different set manage the page cache according to the proportionality of the weight and overhead caused due to an exemplary embodiment of the present disclosure, four different container environments in which control group I/O weights are 100, 200, 400, and 800 are constructed using Docker. Linux Kernel 4.17.3 version is used and as a base image of the container. Ubuntu 14.04 LTS is used from Docker Hub. For an I/O proportionality experiment, four containers are generated to use an FIO benchmark in a conventional Linux environment and an environment to which the page cache managing method according to an exemplary embodiment of the present disclosure is applied. First, a IG file is created in each container and then the same file is read approximately twice to promote pages of the corresponding file from the inactive list to the active list of the page cache. Thereafter, a host driving four containers performs dummy writes of 5G to replace the page of the inactive list and initiate the eviction task in the active list. Last, the same IG file is read gain to check the throughput in order to utilize pages which remain in the active list in the four containers. Thereafter, the proportionality is compared by normalizing the weight of 100.

In an overhead checking experiment, workloads of Filebench which is a real-world benchmark are utilized. Weight values of four containers are equal to each other and fileserver, webserver, webproxy, and videoserver workloads are executed with a base parameter.

As illustrated in FIG. 6, when the I/O proportionality experiment is described, the FIO benchmark is executed in four containers having weights of 100, 200, 400, and 800, respectively.

As illustrated in FIG. 7, when the overhead experiment is described, a workload benchmark of Filebench is executed in four containers having the same weight.

Hereinafter, an experimental result will be described.

In the I/O proportionality experiment illustrated in FIG. 6, in a conventional scheme (baseline), the page cache performs 1I/O processing without considering I/O weights of the control groups, and as a result, respective processes has a similar throughput proportionality even though the I/O weights of the control groups of the processes are different from each other. However, in the page cache managing method according to an exemplary embodiment of the present disclosure, a chance is further provided when the page of the page cache is evicted according to the I/O weights of the control groups of the processes. Therefore, since an exemplary embodiment of the present disclosure has a tendency to remain in the page cache, an exemplary embodiment may have a throughput similarly to the proportionality of the I/O weight. Consequently, containers having weights of 100, 200, 400, and 800 have proportionality of 1:2:4:8 in an ideal case. However, in the conventional scheme, the proportionality has 61% or another proportionality, while in an exemplary embodiment of the present disclosure, the proportionality has only a difference of 13%, and as a result, a throughput close to a significantly ideal proportionality is shown. This is represented as a normalized I/O proportionality.

Further, in an overhead checking experiment illustrated in FIG. 7, in an exemplary embodiment of the present disclosure, as the page remains in the page cache for a longer time, the chance is further provided during the eviction task, and as a result, more circulation of an additional page occurs in the list. Consequently, in this experiment, an exemplary embodiment of the present disclosure has only overhead of 5% at most compared with the conventional scheme.

The I/O proportionality experiment will be described below.

In the conventional scheme (baseline), containers 2, 3, and 4 have I/O throughputs of 1.1, 1.4, and 2.0 times of container 1.

The conventional scheme shows a difference from an ideal value by 61%.

On the contrary, in an exemplary embodiment of the p resent disclosure, containers 2, 3, and 4 have I/O throughputs of 1.3, 3.2, and 9.0 times of container 1.

In an exemplary embodiment of the present disclosure, the difference from the ideal value may be reduced to 13%.

The overhead experiment illustrated in FIG. 7 will be described below.

In an exemplary embodiment of the present disclosure, the fileserver, the webserver, the webproxy, and the videoserver have overhead within 5% with I/O throughputs of 0.99, 0.95, 0.98, and 0.96 times of the conventional scheme. This is represented as a normalized total I/O throughput.

Figure 8:
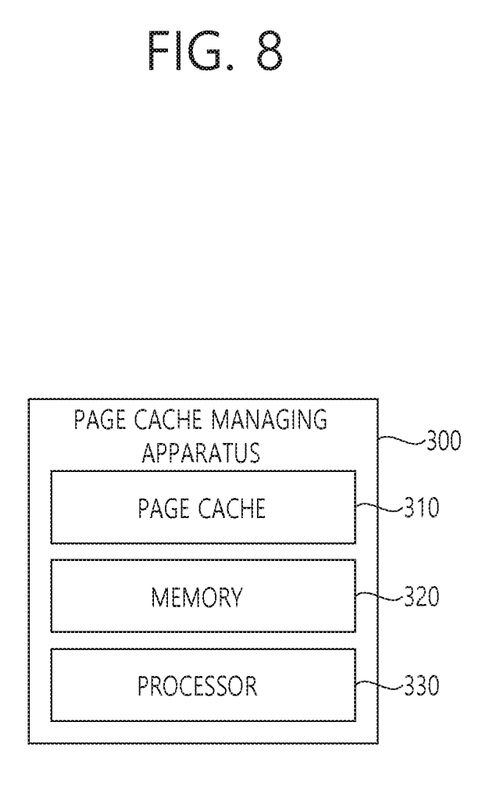
FIG. 8 is a configuration diagram for describing a configuration of apparatuses for managing a page cache for page cache management in a virtualization service according to an exemplary embodiment of the present disclosure.

FIG. 8 is a configuration diagram for describing a configuration of apparatuses for managing a page cache for page cache management in a virtualization service according to an exemplary embodiment of the present disclosure.

As illustrated in FIG. 8, a page cache managing apparatus 300 according to an exemplary embodiment of the present disclosure includes a page cache 310, a memory 320, and a processor 330. However, all illustrated components are not required components. The page cache managing apparatus 300 may be implemented by components which are more than the illustrated components or implemented by components which are less than the illustrated components. Here, the page cache managing apparatus 300 may be included in a Cloud system or a Cloud server in which a virtualization service such as Docker operates. The page cache managing apparatus may operate in the fileserver, the webserver, the webproxy, and the videoserver. The page cache managing apparatus 300 may include the page cache 310 and may be included in an apparatus or a system managing pages in the page cache 310 and is not limited to a specific apparatus, system, or server.

Hereinafter, a detailed configuration and a detailed operation of each of the components of the page cache managing apparatus 300) of FIG. 8 will be described.

The page cache 310 stores pages possessed by the processor operated by the container.

The memory 320 stores at least one command.

The processor 330 is connected to the page cache and the memory.

The processor 330 executes the at least one command to compare a weight value of the container and the weight variable of the page in the virtualization service, change the weight variable of the page based on a comparison result, and manage the pages of the page cache using the changed weight variable of the page.

According to various exemplary embodiments, when a page requested to be read is present in the page cache, the processor 330 may compare the weight value of the container and the weight variable of the page with each other.

According to various exemplary embodiments, when the weight value of the container exceeds the weight variable of the page, the processor 330 may set the weight variable of the page to the weight value of the container.

According to various exemplary embodiments, when the weight value of the container is equal to or less than the weight variable of the page, the processor 330 may maintain the weight variable of the page.

According to various exemplary embodiments, when there is the free space in the page cache, the processor 330 may set the weight variable of the page equal to the weight value of the container and set the chance value of the page using the set weight variable of the page.

According to various exemplary embodiments, when there is free space in the page cache, the processor 330 may compare the sizes of the active list and the inactive list.

According to various exemplary embodiments, when the active list of the page cache exceeds the inactive list of the page cache, the processor 330 separates a predetermined page quantity from the tail of the active list to prepare page eviction.

According to various exemplary embodiments, when a chance value of a page to be evicted in the page cache exceeds a predetermined threshold and the chance value of the page to be evicted exceeds a predetermined remaining chance value, the processor 330 may move the page to be evicted to the head of the active list and then subtract the predetermined chance value.

According to various exemplary embodiments, when the chance value of the page to be evicted in the page cache exceeds the predetermined threshold and the chance value of the page to be evicted is equal to or less than the predetermined remaining chance value, the processor 330 may move the page to be evicted to the tail of the active list and then subtract the predetermined chance value.

According to various exemplary embodiments, when the chance value of the page to be evicted in the page cache does not remain, the processor 330 may move the page to be evicted to the inactive list.

The methods for managing the page cache in the virtualization service according to the exemplary embodiments of the present disclosure may be implemented as a computer readable code in a computer readable recording medium. The methods for managing the page cache in the virtualization service according to the exemplary embodiments of the present disclosure is implemented in a form of a program command which may be performed through various computer means and may be recorded in the computer readable recording medium.

A computer readable storage medium including commands executed by a processor in which the commands are executed by the processor, the processor is configured to compare the weight value of the container and the weight variable of the page in the virtualization service, change the weight variable of the page based on the comparison result, and manage the page of the page cache using the changed weight variable of the page.

The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

Specifically, described features may be executed in a digital electronic circuit, computer hardware, firmware, or combinations thereof. The features may be executed in a computer program product implemented in a storage apparatus in a machine readable storage device for execution by a programmable processor. In addition, the features may be performed by a programmable processor operating on input data and executing programs of directives for performing functions of the exemplary embodiments described by generating an output. The described features may be executed in one or more computer programs which may be executed on a programmable system including at least one programmable combined processor, at least one input device, and at least one output device in order to receive data and directives from a data storage system and in order to transmit the data and the directives to the data storage system. The computer program includes a set of directives which may be directly or indirectly used in the computer in order to perform a specific operation with respect to a predetermined result. The computer program may be written in any form among programming languages including compiled and interpreted languages and used as another unit suitable for use in a module, a device, a subroutine, or another computer environment or as any form included as an independent operable program.

Appropriate processor for executing the programs of the directives include, for example, both universal and special-purpose microprocessors and a single processor or one of multiple processors of different types of computers. Further, storage devices suitable for computer program directives and data implementing the described features include all types of non-volatile memories including semiconductor memory devices such as EPROM, EEPROM, and flash memory devices, magnetic devices such as internal hard disks and removable disks, optical magnetic disks, and CD-ROM and DVD-ROM disks. The processor and the memory may be integrated in application-specific integrated circuits (ASICs) or added by the ASICs.

The aforementioned present disclosure is described based on a series of functional blocks, but not limited to the aforementioned embodiments and the accompanying drawings, and it will be obvious to those skilled in the technical field to which the present disclosure pertains that various substitutions, modifications, and changes may be made within the scope without departing from the technical spirit of the present disclosure.

A combination of the exemplary embodiments is not limited to the aforementioned exemplary embodiment and various forms of combinations may be provided in addition to the aforementioned exemplary embodiments according to implementation and/or a need.

In the aforementioned exemplary embodiments, methods have been described based on flowcharts as a series of steps or blocks, but the methods are not limited to the order of the steps of the present disclosure and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present disclosure and may be deleted.

The aforementioned exemplary embodiment includes various aspects of examples. All possible combinations for showing various aspects may not be described, but those skilled in the art may recognize that different combinations are possible. Accordingly, it will be intended that the present disclosure all other replacements, modifications, and changes which belong to the following claims.

According to exemplary embodiments of the present disclosure, when a resource of a processor is managed using control groups, an I/O weight set for each processor is applied even when a page cache processes I/O, performance of the processes can be provided at a proportionality of the I/O weight.

According to exemplary embodiments of the present disclosure, when the resource is controlled for each individual container using the control groups such as Docker, an I/O throughput of a desired proportionality is provided for each container by using differently setting an I/O weight proportionality for each container, thereby guaranteeing QoS in a virtualization service.

What is claimed is:

1. A method for managing a page cache in a virtualization service, which is performed by a page cache managing apparatus comprising the page cache storing pages, the method comprising:
checking a weight value of a container in the virtualization service;
comparing the weight value of the container with a weight variable of a page;
changing the weight variable of the page based on a comparison result; and
managing the pages of the page cache using the changed weight variable of the page,
wherein the weight variable of the page is an I/O weight value set in the page and stored in a page structure of the page.

2. The method of claim 1, wherein the comparing of the weight variable of the page comprises comparing the weight value of the container and the weight variable of the page with each other, when a page requested to be read exists in the page cache.

3. The method of claim 1, wherein the changing of the weight variable of the page comprises setting the weight variable of the page to the weight value of the container, when the weight value of the container exceeds the weight variable of the page.

4. The method of claim 1, wherein the changing of the weight variable of the page comprises maintaining the weight variable of the page, when the weight value of the container is equal to or less than the weight variable of the page.

5. The method of claim 1, wherein the managing of the pages of the page cache comprises setting the weight variable of the page equal to the weight value of the container and setting a chance value of the page by dividing the weight value of the container by 100 and subtracting 1 from the corresponding value to set the acquired value to the chance value of the page, when there is a free space in the page cache.

6. The method of claim 1, wherein the managing of the pages of the page cache comprises comparing sizes of an active list and an inactive list with each other, when there is no free space in the page cache.

7. The method of claim 6, wherein the managing of the pages of the page cache comprises separating a predetermined page quantity from a tail of the active list to prepare page eviction, when the active list of the page cache exceeds the inactive list of the page cache.

8. The method of claim 1, wherein the managing of the pages of the page cache comprises moving a page to be evicted to a head of an active list and then subtracting a predetermined chance value, when a chance value of the page to be evicted in the page cache exceeds a predetermined threshold and the chance value of the page to be evicted exceeds a predetermined remaining chance value.

9. The method of claim 1, wherein the managing of the pages of the page cache comprises moving a page to be evicted to a tail of an active list and then subtracting a predetermined change value, when a chance value of the page to be evicted in the page cache exceeds a predetermined threshold and the chance value of the page to be evicted is equal to or less than a predetermined remaining chance value.

10. The method of claim 1, wherein the managing of the pages of the page cache comprises moving a page to be evicted to an inactive list, when a chance value of the page to be evicted in the page cache does not remain.

11. An apparatus for managing a page cache, the apparatus comprising:
the page cache storing pages allocated by a processor operated by a container;
a memory storing at least one command; and
the processor connected to the page cache and the memory,
wherein the processor is configured to:
check a weight value of the container,
execute the at least one command to compare the weight value of the container and a weight variable of a page with each other in a virtualization service,
change the weight variable of the page based on a comparison result, and
manage the pages of the page cache using the changed weight variable of the page,
wherein the weight variable of the page is an I/O weight value set in the page and stored in a page structure of the page.

12. The apparatus of claim 11, wherein when a page requested to be read exists in the page cache, the processor is configured to compare the weight value of the container and the weight variable of the page with each other.

13. The apparatus of claim 11, wherein when the weight value of the container exceeds the weight variable of the page, the processor is configured to set the weight variable of the page to the weight value of the container.

14. The apparatus of claim 11, wherein when the weight value of the container is equal to or less than the weight variable of the page, the processor is configured to maintain the weight variable of the page.

15. The apparatus of claim 11, wherein when there is a free space in the page cache, the processor is configured to:
   set the weight variable of the page equal to the weight value of the container, and
   seta chance value of the page by dividing the weight value of the container by 100 and subtracting 1 from the corresponding value to set the acquired value to the chance value of the page, when there is a free space in the page cache.

16. The apparatus of claim 11, wherein when there is no free space in the page cache, the processor is configured to compare sizes of an active list and an inactive list with each other.

17. The apparatus of claim 16, wherein when the active list of the page cache exceeds the inactive list of the page cache, the processor is configured to separate a predetermined page quantity from a tail of the active list to prepare page eviction.

18. The apparatus of claim 11, wherein when a chance value of a page to be evicted in the page cache exceeds a predetermined threshold and the chance value of the page to be evicted exceeds a predetermined remaining chance value, the processor is configured to move the page to be evicted to a head of an active list and then subtracts a predetermined chance value.

19. The apparatus of claim 11, wherein when a chance value of a page to be evicted in the page cache exceeds a predetermined threshold and the chance value of the page to be evicted is equal to or less than a predetermined remaining chance value, the processor is configured to move the page to be evicted to a tail of an active list and then subtracts a predetermined chance value.

20. The apparatus of claim 11, wherein when a chance value of a page to be evicted in the page cache does not remain, the processor is configured to move a page to be evicted to an inactive list.

* * * * *